United States Patent [19]

Kitamoto et al.

[11] 4,414,271
[45] Nov. 8, 1983

[54] MAGNETIC RECORDING MEDIUM AND METHOD OF PREPARATION THEREOF

[75] Inventors: Tatsuji Kitamoto; Ryuji Shirahata; Yasuyuki Yamada; Goro Akashi, all of Odawara, Japan

[73] Assignee: Fuji Photo Film Co., Ltd., Minami-ashigara, Japan

[21] Appl. No.: 352,220

[22] Filed: Feb. 25, 1982

[30] Foreign Application Priority Data

Feb. 27, 1981 [JP] Japan .................................. 56-28196

[51] Int. Cl.³ .............................................. B32B 5/16
[52] U.S. Cl. ..................................... 428/328; 427/57; 427/128; 427/130; 427/131; 427/132; 427/258; 428/336; 428/694; 428/695; 428/900
[58] Field of Search ................................ 427/127–132, 427/48, 57, 258; 428/900, 694, 695, 328, 336

[56] References Cited

U.S. PATENT DOCUMENTS

| 2,671,034 | 3/1954 | Steinfeld | 117/71 |
| 3,144,353 | 8/1964 | Hargis et al. | 117/138.8 |
| 3,320,090 | 5/1967 | Graubart | 117/161 |
| 3,329,601 | 7/1967 | Mattox | 204/298 |
| 3,342,632 | 9/1967 | Bate et al. | 117/217 |
| 3,342,633 | 9/1967 | Bate et al. | 117/217 |
| 3,404,997 | 10/1968 | Jacobson | 117/62 |
| 3,437,510 | 4/1969 | Diaz | 117/62 |
| 3,516,860 | 6/1970 | Simmons | 117/236 |
| 3,574,684 | 4/1971 | Higashi | 117/237 |
| 3,597,273 | 8/1971 | Akashi et al. | 117/235 |
| 3,615,911 | 10/1971 | Nesbitt | 148/31.57 |
| 3,625,849 | 12/1971 | Rogalla | 204/192 |
| 3,690,946 | 9/1972 | Hartmann et al. | 117/235 |
| 3,700,500 | 10/1972 | Rodbell et al. | 117/239 |
| 3,772,174 | 11/1973 | Spalvins | 204/192 |
| 3,781,210 | 12/1973 | Lohoff | 252/62.54 |
| 3,781,211 | 12/1973 | Lohoff | 252/62.54 |
| 3,787,237 | 1/1974 | Grunberg et al. | 117/239 |
| 3,856,579 | 12/1974 | Allen et al. | 148/103 |
| 3,993,824 | 11/1976 | Shirahata et al. | 428/216 |
| 4,239,835 | 12/1980 | Iijima et al. | 428/62 |
| 4,307,156 | 12/1981 | Yanagisawa | 427/131 |

FOREIGN PATENT DOCUMENTS

| 39-8103 | 5/1964 | Japan . |
| 40-9779 | 5/1965 | Japan . |
| 41-7192 | 4/1966 | Japan . |
| 41-8016 | 4/1966 | Japan . |
| 41-14275 | 8/1966 | Japan . |
| 45-14501 | 5/1970 | Japan . |
| 45-24902 | 8/1970 | Japan . |
| 46-13103 | 4/1971 | Japan . |
| 47-22065 | 6/1972 | Japan . |
| 47-22067 | 6/1972 | Japan . |
| 47-22072 | 6/1972 | Japan . |
| 47-22073 | 6/1972 | Japan . |
| 47-28045 | 7/1972 | Japan . |
| 47-28048 | 7/1972 | Japan . |
| 50-136009 | 10/1975 | Japan . |
| 52-70811 | 6/1977 | Japan . |
| 52-108804 | 9/1977 | Japan . |
| 53-19004 | 2/1978 | Japan . |
| 53-24806 | 3/1978 | Japan . |
| 53-42706 | 4/1978 | Japan . |
| 53-42707 | 4/1978 | Japan . |
| 54-11703 | 1/1979 | Japan . |
| 54-14711 | 2/1979 | Japan . |
| 54-21806 | 2/1979 | Japan . |
| 1189041 | 4/1970 | United Kingdom . |

OTHER PUBLICATIONS

"Vacuum Deposition of Thin Film", L. Holland, Chapman and Hall Ltd., 1956.
"Handbook of Thin Film Technology", L. I. Maissel & R. Glang, McGraw-Hill Co., 1970.

Primary Examiner—Bernard D. Pianalto
Attorney, Agent, or Firm—Fleit, Jacobson, Cohn & Price

[57] ABSTRACT

A magnetic recording medium comprising a substrate, a thin magnetic metal film having spaced-apart columnar grains deposited on the substrate, and a crosslinked organic polymer formed from a polymerizable organic compound and a curing agent in the spaces between the columnar grains and integrated therewith. The medium is prepared by impregnating the spaces between the columnar grains with a polymerizable organic compound and a curing agent and curing them in the spaces by the crosslinking reaction.

21 Claims, 1 Drawing Figure

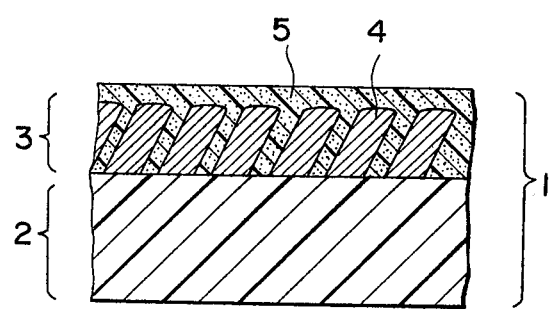

MAGNETIC RECORDING MEDIUM AND METHOD OF PREPARATION THEREOF

BACKGROUND OF THE INVENTION

1. Field of the Invention

This invention relates to an improvement in a magnetic recording medium having a magnetic thin film recording layer formed by the vapor deposition process, and more particularly to a vapor deposition type magnetic recording medium showing improved durability, and a method of preparation thereof.

2. Description of the Prior Art

Coating type magnetic recording media are widely used. These magnetic recording media use powdered magnetic materials such as magnetic oxide particles and ferromagnetic alloy particles, for example, $\gamma\text{-}Fe_2O_3$, Co-doped $\gamma\text{-}Fe_2O_3$, $Fe_3O_4$, Co-doped $Fe_3O_4$, Berthollide compounds of $\gamma\text{-}Fe_2O_3$ and $Fe_3O_4$, $CrO_2$ or the like. These powdered magnetic materials are dispersed in organic binders such as vinyl chloride-vinyl acetate copolymers, styrene-butadiene copolymers, epoxy resins and polyurethane resins. The dispersions thus obtained are then applied in coats on non-magnetic substrates and dried to form the magnetic recording media. Recently, because of their ability to meet strong demand for high density recording, so-called thin metal film type magnetic recording media using no binders have attracted attention. The magnetic recording media of this type have magnetic recording layers which consist of ferromagnetic metal thin films formed by a vapor deposition process such as vacuum deposition, sputtering and ion plating, or a plating process such as electroplating and electroless plating. Thus various efforts are being made to develop thin metal film type magnetic recording media suitable for practical use.

In the conventional coating type magnetic recording media, metal oxides showing low saturation magnetization are mainly used as the magnetic material. If the thickness of the magnetic material layer on substrate in reduced, the signal output level also drops because of low saturation magnetization. Therefore, it is impossible to reduce the thickness of the magnetic material layer to such an extent as required for the high density recording. In addition, the coating type magnetic recording media are also disadvantageous in that they require complicated production processes and bulky equipment for the recovery of solvents or for pollution control. On the other hand, the thin metal film type magnetic recording media can be provided with extremely thin magnetic films. In this type of magnetic recording media, ferromagnetic metals showing higher saturation magnetization than metal oxides can be formed as thin films on substrates without using non-magnetic materials such as binders. Among the thin metal film type magnetic recording media, a vapor deposition type magnetic recording medium having a magnetic film formed from a magnetic material in vapor phase is advantageous because the magnetic film can be formed at a high speed, because the production process is simple and because the no treatment steps for the disposal of waste liquor are necessary.

However, the vapor deposition type magnetic recording medium involves certain problems, one of which is that concerning the impact and friction strength. That is, the recording layer of the medium is sometimes broken by contact with a magnetic head or a guide pole when moved relative to the magnetic head or the guide pole during the recording, reproducing and erasing of magnetic signals. In addition, when the vapor deposition type magnetic recording medium is exposed to high temperature and humidity for long periods of time, the magnetic layer sometimes peels off or the bond strength decreases due to the corrosive effects of such an environment to such an extent that the magnetic recording medium cannot be used any more.

To solve the above described problem of the vapor deposition type magnetic recording medium, an attempt has been made to apply an overcoat, which has a thickness of about $0.2\mu$ and is made of a high-molecular weight material in a film form, onto the recording layer. However, this method is not desirable because the output level of the magnetic signal decreases in the case of high density recording due to the space loss which is caused by the thickness of the overcoat. If the thickness of the overcoat is reduced to minimize the space loss, the magnetic recording medium becomes less durable and cannot satisfactorily be used in practical applications. Further, the effect of the overcoat to provide durability deteriorates when the magnetic recording medium is used over long periods of time.

SUMMARY OF THE INVENTION

The object of the present invention is to provide a vapor deposition type magnetic recording medium which shows excellent durability and can eliminate the disadvantages of the conventional magnetic recording media as described above.

Another object of the present invention is to provide a vapor deposition type magnetic recording medium which can retain the effect of the improvement in durability for long periods of time.

A further object of the present invention is to provide a vapor deposition type magnetic recording medium which is extremely thin and yet shows excellent durability.

A still further object of the present invention is to provide a vapor deposition type magnetic recording medium which is extremely durable and yet exhibits the magnetic characteristics desirable of a high density magnetic recording medium.

An even further object of the present invention is to provide a method of preparing an extremely durable vapor deposition type magnetic recording medium in a simple manner.

The inventors studied the thin metal film magnetic recording medium and found that the durability thereof can be improved remarkably if a magnetic film having columnar grain structures is vapor-deposited on a substrate, the spaces between the columnar grain structures are impregnated with a polymerizable organic oligomer or polymer in the liquid form or a solution of a polymerizable organic polymer and a curing agent (or hardener), and then the organic oligomer or polymer and the curing agent are polymerized with crosslinking in the spaces between the columnar grain structures. It was also found that the effect of the improved durability could be retained for long periods of time.

Accordingly, the present invention provides a magnetic recording medium comprising a substrate, a thin ferromagnetic metal film which has the spaced-apart columnar grain structures formed on the substrate, and a crosslinked organic polymer formed from a polymerizable organic oligomer or polymer and a curing agent at least in the spaces between the columnar grain structures and integrated with the thin ferromagnetic metal film.

ditions for the different methods are as listed in Table 1 below.

TABLE 1

| Conditions | Process | | | | |
|---|---|---|---|---|---|
| | Vacuum deposition | Sputtering | Ion plating | Ion beam deposition | Chemical vapor deposition |
| Pressure of atmosphere in square brackets (Torr) | $\lesssim 10^{-5}$ | $10^{-2} \sim 10^{-3}$ [Ar] | $10^{-2} \sim 10^{-3}$ [Ar] | $10^{-5} \sim 10^{-6}$ | <1 atm [Ar] |
| Temperature of material | Evaporation temperature | Water cooling | Evaporation temperature | — | >Evaporation temperature |
| Film thickness | ~Several microns | ~Several tens of microns | ~Several tens of microns | ~Several microns | ~Several hundreds of microns |
| Deposition rate (Å/sec) | ~Several hundreds | ~Several hundreds | ~Several hundreds | Several tens ~3000 | $10^2$ |
| Voltage applied | — | Several volts~ several hundreds of volts | Several tens of volts~ 10kV (glow discharge) | ~500V | — |

The present invention also provides a method of preparing a magnetic recording medium which comprises vapor-depositing a thin ferromagnetic metal film with spaced-apart columnar grain structures onto a substrate, impregnating the spaces between the columnar grain structures with a polymerizable organic oligomer or polymer in the liquid form or a solution of a polymerizable organic polymer and a curing agent, and then crosslink-polymerizing the organic oligomer or polymer and the curing agent at least in the spaces between the columnar grain structures. The curing agent may be contained in advance in the organic oligomer or polymer, or may be of the two-part system where the curing agent is added to the organic oligomer or polymer when the latter is to be cured. Curing is effected with heat when a thermosetting resin is used, or by mixing and reacting two components of the two-part system when a reactive resin of the two-part system is used.

BRIEF DESCRIPTION OF THE DRAWING

The FIGURE is a schematic view showing an embodiment of the magnetic recording medium according to the present invention.

DESCRIPTION OF THE PREFERRED EMBODIMENTS

Now the present invention will be described in detail with reference to the drawing.

Referring to the FIGURE showing an embodiment of the magnetic recording medium according to the present invention, a magnetic recording medium 1 consists of a non-magnetic substrate 2 and a magnetic metal thin film layer 3 formed thereon by the vapor deposition process. The magnetic metal thin film layer 3 comprises columnar grain structures 4, and a polymer 5 in the gaps between the columnar grain structures 4.

The term "vapor deposition process" as used herein means a process in which a material or a compound thereof to be deposited is converted into vapor or ionized vapor and deposited onto a substrate in a gas or a vacuum. It broadly embraces the vacuum deposition, sputtering, ion plating and chemical vapor deposition processes and the like.

The conditions under which the vapor deposition process is carried out differ largely according to the method and the material used. The main treatment con- The ferromagnetic metal layer to be used as the magnetic recording layer in accordance with the present invention is formed on a supporting layer (or a prime-coating layer) by vapor-depositing the ferromagnetic metals or alloys thereupon in the form of a thin film. Usable ferromagnetic metals include cobalt, nickel or the like. The ferromagnetic alloys may be, for example, Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-La, Co-Ni-Ce, Co-Ni-Zn, Co-Ni-Cu, Co-Ni-W, Co-Ni-Re, Co-Sm-Cu, or the like. The thickness of the ferromagnetic metal layer for use in the magnetic recording medium generally ranges from $0.05\mu$ to $2\mu$, preferably from $0.1\mu$ to $0.4\mu$.

Formation of the ferromagnetic metal layer as described above by the vapor deposition process is described for example by L. Holland in "Vacuum Deposition of Thin Film" (Chapman & Hall Ltd., 1956), L. I. Maissel & R. Glang in "Handbook of Thin Film Technology" (McGraw-Hill Co., 1970), and in U.S. Pat. Nos. 2,671,034, 3,329,601, 3,342,632, 3,342,633, 3,516,860, 3,615,911, 3,625,849, 3,700,500, 3,772,174, 3,772,179, 3,787,237, and 3,856,579.

The oblique incidence deposition process is particularly preferred for the purpose of forming the magnetic metal thin film layer which contains the columnar grain structures spaced apart from each other so as to allow a polymer to intervene therebetween. In the oblique incidence deposition process, a ferromagnetic metal is vaporized and the obtained vapor stream of the ferromagnetic metal is caused to impinge upon a substrate at an oblique angle with respect to the surface of the substrate. In this way, a thin film of the ferromagnetic metal is formed on the substrate. The thin film of the magnetic metal formed by the oblique incidence deposition process not only has columnar grain structures spaced apart from one another but also exhibits those magnetic characteristics which are desirable for a high-density magnetic recording medium. In the oblique incidence deposition, it is preferred that the incident angle of the vapor stream of the ferromagnetic metal be 50° or more. In this case, a film having the columnar grain structures having their longitudinal axes lying at an oblique angle with respect to the surface of a substrate 2 is formed as shown in the FIGURE. Normally, the angle of the longitudinal axes of the formed columnar grain structures with respect to a line normal to the surface of the substrate is smaller than the incident angle of the vapor stream during the deposition process. The volumetric ratio of the spaces between the columnar grain structures in the thin film layer 3 of magnetic metal may vary from 10% to 60% when the incident angle of the vapor stream is 50° or more.

The polymerizable organic compounds used in the present invention may be thermosetting or reactive resins, whose molecular weight is 200,000 or less in the form of coating liquid or solution and increases infinitely through the condensation, addition or the like after the resins are applied onto the substrate and dried. Among these, those which do not soften or melt before thermal decomposition are preferred. The preferred resins of this type are, for example, phenolic resins, epoxy resins, polyurethane hardening resins, urea resins, melamine resins, alkyd resins, silicone resins, acrylic reactive resins, a mixture of high molecular weight polyester resin and isocyanate prepolymer, a mixture of methacrylate copolymer and diisocyanate prepolymer, a mixture of polyester polyol and polyisocyanate, urea-formaldehyde resins, a mixture of low molecular weight glycol and high molecular weight diol and triphenylmethane triisocyanate, polyamine resins and a mixture of the above or the like.

The above described resins are described in, for example, Japanese Patent Publication Nos. 39(1964)-8103, 40(1965)-9779, 41(1966)-7192, 41(1966)-8016, 41(1966)-14275, 42(1967)-18179, 43(1968)-12081, 44(1969)-28023, 45(1970)-14501, 45(1970)-24902, 46(1971)-13103, 47(1972)-22065, 47(1972)-22066, 47(1972)-22067, 47(1972)-22072, 47(1972)-22073, 47(1972)-28045, 47(1972)-28048, and 47(1972)-28922; U.S. Pat. Nos. 3,144,353, 3,320,090, 3,437,510, 3,597,273, 3,781,210, and 3,781,211.

These resins are used individually or in admixture with one another.

An additive may be added to the above-mentioned resins. A lubricant may be added as an additive to the thermosetting resins.

The lubricant may be silicone oil, a fatty acid ester of a monobasic fatty acid having from 12 to 16 carbon atoms and a monohydric alcohol having from 3 to 12 carbon atoms, a fatty acid ester of a monobasic fatty acid having 17 or more carbon atoms and a monohydric alcohol giving a total of 21 to 23 carbon atoms including the carbon atoms of the monobasic fatty acid, or the like. The lubricant is used in an amount of 0.2 to 20 parts by weight per 100 parts by weight of the thermosetting resin.

In impregnating the spaces between the columnar grain structures with a solution of a polymerizable organic liquid oligomer or polymer in accordance with the present invention, a solution of a polymerizable organic liquid oligomer or polymer is applied to the magnetic metal thin film having the columnar grain structures and dried, if necessary. Ultrasonic waves may be directed onto the magnetic metal thin film to promote the penetration of the organic compound into the space between the columnar grain structures. After the application of the organic compound into the spaces between the columnar grain structures, the excess of the organic compound above the grain structures should preferably be removed by use of an organic solvent or the like. This is because a thick organic layer on the magnetic metal thin film can result in a space loss due to the thickness of the organic layer and adversely affect the electromagnetic transducing characteristics of the magnetic recording medium. The amount of the organic compound contained in the magnetic metal thin film layer cannot be defined absolutely. In general, however, the amount thereof will be 0.5 to 1,000 mq/m$^2$.

As described above, organic solvents may be used when applying the organic compound to the magnetic metal thin film in accordance with the present invention. Examples of the organic solvents which may be used for this purpose are ketones such as acetone, methyl ethyl ketone, methyl isobutyl ketone, and cyclohexanone; alcohols having from 1 to 10 carbon atoms, such as methyl alcohol, ethyl alcohol, propyl alcohol, and butyl alcohol; esters such as methyl acetate, ethyl acetate, butyl acetate, ethyl lactate, and glycol acetate monoethyl ether; ethers such as ethyl ether, ethylene glycol dimethyl ether, ethylene glycol monoethyl ether, and dioxane; aromatic hydrocarbons such as benzene, toluene, and xylene; chlorinated hydrocarbons such as methylene chloride, ethylene chloride, carbon tetrachloride, chloroform, ethylene chlorohydrin, and dichlorobenzene, or the like.

A lubricant or an antifungal agent may also be introduced between the columnar grain structures together with the solution of a polymerizable organic liquid oligomer or polymer, if necessary. The lubricant may be of the type described, e.g., in Japanese Unexamined Patent Publication Nos. 50(1975)-114205 (U.S. Pat. No. 3,993,824), 50(1975)-136009, 52(1977)-70811, 52(1977)-108804, 53(1978)-19004, 53(1978)-24806, 53(1978)-42706, 53(1978)-42707, 54(1979)-11703, 54(1979)-14711 and 54(1979)-21806. The antifungal agents which can be used in the present invention are described, e.g., in Japanese Patent Application No. 54(1979)-26880.

The present invention will further be illustrated by the following nonlimitative examples.

EXAMPLE 1

A cobalt magnetic film (thickness: 0.2μ) was obliquely deposited upon a 20μ-thick polyethylene terephthalate film to form a magnetic tape. The oblique deposition was conducted using an electron beam evaporation source charged with 99.95% pure cobalt in a vacuum of $5 \times 10^{-5}$ Torr at an incident angle of 70°.

Observation with a scanning electron microscope revealed that the columnar grain structures were formed on the substrate film and that the longitudinal axes of the columnar grain structures were at an angle of 50° with respect to a line perpendicular to the surface of the substrate film. The volumetric ratio of the spaces between the columnar grain structures was 20%. On the thus obtained magnetic tape was applied a solution of 20 parts by weight of an epoxy resin having an epoxy equivalent of 150 and an average molecular weight of 350, 18 parts by weight of a polyamide resin having an amine number of 300 and an average molecular weight of 2,500, and 0.7 part by weight of stearic acid (lubricant) in 1,460 parts by weight of methyl ethyle ketone. In this way, the solution was applied between the columnar grain structures in the magnetic tape so that the dry weight would be 50 mg/m$^2$. After the solution had dried completely, it was heat treated at 60° C. for 24 hours to cause crosslinking reaction. The magnetic tape treated as described above was designated as specimen No. 11. Another specimen (No. 12) was prepared as a control in the same way as described above, except that the treatment according to the present invention was not effected.

EXAMPLE 2

An Fe-V alloy magnetic film (5 wt.% V, thickness 0.25μ) was obliquely deposited on a 12μ-thick polyethylene terephthalate film at an incident angle of 75°. In this way, a thin magnetic metal film having columnar grain structures was formed on the substrate film so as to obtain a magnetic tape. The longitudinal axes of the columnar grain structures were at an angle of 62° with respect to a line perpendicular to the surface of the substrate film. The volumetric ratio of the spaces between the columnar grain structures was 35%. On the other hand, 20 parts by weight of a polyester polyol having a hydroxyl number of 280 and formed from adipic acid, phthalic acid and hexane triol, 20 parts by weight of an addition product of trimethylolpropane and toluene diisocyanate, and 0.2 part by weight of silicone oil were dissolved in 1,500 parts by weight of methyl ethyl ketone. This solution was then applied between the columnar grain structures in the previously prepared magnetic tape in such an amount that the dry weight would be 75 mq/m². During this application, the solution was irradiated with an ultrasonic wave. The magnetic tape treated as described above was designated as specimen No. 21. Another specimen (No. 22) was also prepared in the same way as described above, except that the treatment according to the present invention was omitted.

COMPARATIVE EXAMPLE

A cobalt magnetic film was electrolessly plated to a thickness of 0.2μ on a 12μ-thick polyethylene terephthalate film as described below:
(1) Alkali etching
  For 10 minutes at 80° C. in an aqueous 5 mol/liter sodium hydroxide solution.
(2) Washing with water
(3) Sensitizing
  Using a sensitizer liquid containing 10 g of $SnCl_2.2H_2O$ and 30 ml of HCl per liter.
(4) Washing with water
(5) Activating
  Using an activator liquid containing 0.25 g of $PdCl_2$ and 10 ml of HCl per liter.
(6) Washing with water
(7) Electroless plating
  Composition of plating liquid:
   $CoCl_2.6H_2O$: 9.5 g/liter
   $NaH_2PO_2.H_2O$: 5.3 g/liter
   $NH_4Cl$: 10.7 g/liter
   Citric acid: 26.5 g/liter
   Boric acid: 30.9 g/liter
  Plating conditions:
   pH 7.5, 5 minutes at a liquid temperature of 80° C.
(8) Washing with water and drying.

Observations with a scanning electron microscope revealed that the thin magnetic film formed had no columnar grain structures but that it consisted of nearly spherical grains crowded together with no spaces therebetween. The magnetic tape thus obtained was treated in the same ways as described in Examples 1 and 2 above to obtain specimen Nos. 31 and 32. For specimen No. 33, the treatment according to the present invention was omitted.

Thereafter, durability tests were conducted on the specimens obtained in the examples and comparative example described above. In the durability tests, 0.5-inch wide magnetic tapes were reciprocated 0, 10 and 50 times, respectively, at a speed of 3.3 cm/second under a tension of 90 g/0.5 inch in a VHS system video tape recorder. Then, the specimens were checked for flaws and the still frame reproducing time was measured. The test results were as shown in Table 2 below.

TABLE 2

| | Durability | | | | | |
|---|---|---|---|---|---|---|
| | Original | | After 10 runs | | After 50 runs | |
| Specimen | Flaw | Still | Flaw | Still | Flaw | Still |
| No. 11 | ⊙ | 25' | ○ | 20' | ○ | 20' |
| No. 12 | XX | 10" | XXX | Not measurable | XXX | Not measurable |
| No. 21 | ⊙ | 20' | ○ | 20' | ○ | 15' |
| No. 22 | XX | 35" | XXX | 5" | XXX | Not measurable |
| No. 31 | ○ | 2' | X | 30" | XX | Not measurable |
| No. 32 | ○ | 1' | XXX | Not measurable | XXX | Not measurable |
| No. 33 | X | 30" | XXX | Not measurable | XXX | Not measurable |

⊙ = No flaws
○ = No deep flaws, two or less shallow flaws for entire length
X = Deep flaws
XX = Many deep flaws
XXX = Scraped off almost entirely
"Not measurable" in the "still" column in Table 2 means that the reproduced image could not be obtained due to the existence of so many flaws on the deposited magnetic layer that the still frame reproduction test could not be conducted.

As is clear from the test results shown in Table 2, the thin metal film type magnetic recording medium according to the present invention (specimen Nos. 11 and 21) exhibited remarkably improved durability. In addition, the effect of improved durability was retained over a long period of time. Accordingly, the magnetic recording medium of the present invention is extremely practical.

We claim:
1. A magnetic recording medium comprising a substrate, a thin ferromagnetic metal film having spaced-apart columnar grain structures formed on said substrate, and a crosslinked organic polymer formed from a polymerizable organic compound and a curing agent at least in the spaces between said columnar grain structures and integrated with said thin ferromagnetic metal film.

2. A magnetic recording medium as defined in claim 1 wherein said thin ferromagnetic metal film is formed on said substrate by vapor deposition.

3. A magnetic recording medium as defined in claim 2 wherein said vapor deposition is effected by the oblique incidence deposition process.

4. A magnetic recording medium as defined in claim 1 wherein said thin ferromagnetic metal film has a thickness within the range from 0.05μ to 2μ.

5. A magnetic recording medium as defined in claim 4 wherein said thin ferromagnetic metal film has a thickness within the range from 0.1μ to 0.4μ.

6. A magnetic recording medium as defined in claim 1 wherein the volumetric ratio of the spaces between said columnar grain structures in said thin ferromagnetic metal film is from 10% to 60%.

7. A magnetic recording medium as defined in claim 1 wherein said polymerizable organic compound is a thermosetting selected from the group consisting of thermosetting and reactive resins.

8. A magnetic recording medium as defined in claim 7 wherein said thermosetting and reactive resins have a molecular weight of 200,000 or less when they are in the form of a coating solution, and exhibit an infinite increase in the molecular weight after being coated onto the substrate and dried.

9. A magnetic recording medium as defined in claim 7 wherein said thermosetting and reactive resins do not soften or melt prior to thermal decomposition.

10. A magnetic recording medium as defined in claim 1 wherein said crosslinked organic polymer contains a lubricant.

11. A method of preparing a magnetic recording medium which comprises vapor-depositing a thin ferromagnetic metal film having spaced-apart columnar grain structures onto a substrate, impregnating the spaces between the columnar grain structures with at least one polymerizable organic compound and a curing agent, and curing said at least one polymerizable organic compound and said curing agent through crosslinking reaction at least in the spaces between the columnar grain structures, whereby the resulting cured product is integrated with said thin ferromagnetic metal film.

12. A method of preparing a magnetic recording medium as defined in claim 11 wherein said vapor deposition is effected by the oblique incidence deposition process.

13. A method of preparing a magnetic recording medium as defined in claim 12 wherein the incident angle of the vapor stream of the ferromagnetic metal is 50° or more.

14. A method of preparing a magnetic recording medium as defined in claim 11 wherein said thin ferromagnetic metal film has a thickness within the range from $0.05\mu$ to $2\mu$.

15. A method of preparing a magnetic recording medium as defined in claim 14 wherein said thin ferromagnetic metal film has a thickness within the range from $0.1\mu$ to $0.4\mu$.

16. A method of preparing a magnetic recording medium as defined in claim 11 wherein the volumetric ratio of the spaces between said columnar grain structures in said thin ferromagnetic metal film is from 10% to 60%.

17. A method of preparing a magnetic recording medium as defined in claim 11 wherein an ultrasonic wave is directed onto said thin ferromagnetic metal film during the application of said at least one polymerizable organic compound and said curing agent.

18. A method of preparing a magnetic recording medium as defined in claim 11 wherein said at least one polymerizable organic compound is selected from the group consisting of thermosetting and reactive resins.

19. A method of preparing a magnetic recording medium as defined in claim 18 wherein said thermosetting and reactive resins have a molecular weight of 200,000 or less when they are in the form of a coating solution, and exhibit an infinite increase in the molecular weight after being coated onto the substrate and dried.

20. A method of preparing a magnetic recording medium as defined in claim 18 wherein said thermosetting and reactive resins do not soften or melt prior to thermal decomposition.

21. A method of preparing a magnetic recording medium as defined in claim 11 wherein said cured product contains a lubricant.

* * * * *